(12) United States Patent
Feyereisen et al.

(10) Patent No.: US 8,314,816 B2
(45) Date of Patent: Nov. 20, 2012

(54) SYSTEM AND METHOD FOR DISPLAYING INFORMATION ON A DISPLAY ELEMENT

(75) Inventors: Thea L. Feyereisen, Hudson, WI (US); Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 835 days.

(21) Appl. No.: 12/480,242

(22) Filed: Jun. 8, 2009

(65) Prior Publication Data
US 2010/0309222 A1   Dec. 9, 2010

(51) Int. Cl.
*G09G 5/00*   (2006.01)
*G01S 13/00*   (2006.01)

(52) U.S. Cl. ...................... 345/634; 342/25 A

(58) Field of Classification Search .......... None
See application file for complete search history.

(56) References Cited

U.S. PATENT DOCUMENTS

| | | | | |
|---|---|---|---|---|
| 4,719,503 A * | 1/1988 | Craver et al. | ................. | 348/717 |
| 5,339,085 A | 8/1994 | Katoh et al. | | |
| 5,629,988 A * | 5/1997 | Burt et al. | ..................... | 382/276 |
| 6,583,751 B1 * | 6/2003 | Ferretti et al. | ............. | 342/25 R |
| 6,780,152 B2 * | 8/2004 | Ustuner et al. | ................ | 600/443 |
| 7,310,606 B2 * | 12/2007 | Nemethy et al. | .................. | 705/5 |
| 7,428,345 B2 * | 9/2008 | Caspi et al. | .................... | 382/294 |
| 7,515,087 B1 | 4/2009 | Woodell et al. | | |
| 7,596,281 B2 * | 9/2009 | Irani et al. | ...................... | 382/276 |
| 8,045,749 B2 * | 10/2011 | Rhoads et al. | ................ | 382/100 |

FOREIGN PATENT DOCUMENTS

| | | |
|---|---|---|
| DE | 19806450 A1 | 8/1999 |
| WO | 2007015631 A1 | 2/2007 |

OTHER PUBLICATIONS

Communication Pursuant to Article 94(3) EPC, Application No. 10164798.0-2220, dated May 31, 2011.
EP Search Report, EP 10164798.0-2220 dated Oct. 18, 2010.
Utility U.S. Appl. No. 12/401,460, filed Mar. 10, 2009; Whitlow, et al.

* cited by examiner

*Primary Examiner* — Ryan R Yang
(74) *Attorney, Agent, or Firm* — Ingrassia Fisher & Lorenz, P.C.

(57) ABSTRACT

A method of displaying information on a display element is provided. The display element may be deployed in a vehicle such as an aircraft. The method obtains range data for objects located in a sensing region at a sampling time, and obtains image data corresponding to an image of the sensing region at the sampling time. The method continues by deriving first graphics content from the range data, and by deriving second graphics content from the image data. The first graphics content is correlated with the second graphics content such that they are spatially and temporally aligned with one another. Then, the correlated graphics content is rendered on the display element.

16 Claims, 6 Drawing Sheets

SYSTEM AND METHOD FOR DISPLAYING INFORMATION ON A DISPLAY ELEMENT

TECHNICAL FIELD

The subject matter described herein relates generally to display systems, and more particularly, the subject matter relates to synthetic vision display systems adapted for correlating data sources for depicting objects using the most recently obtained data.

BACKGROUND

The prior art is replete with electronic display systems and various applications for their use. Display systems are often used in a manufacturing setting, for diagnostic and research equipment, in navigation systems, in entertainment systems, and in vehicles. For instance, modern flight deck displays (or cockpit displays) for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display. The perspective view provides a three-dimensional view of the vehicle flight plan (or vehicle forward path) and may include various map features including, for example, weather information, terrain information, political boundaries, and navigation aids (e.g., waypoint symbols, line segments that interconnect the waypoint symbols, and range rings). The terrain information may include a synthetic representation of terrain, as well as terrain cautions and warnings which, among other things, may indicate terrain that may obstruct the current flight path of the aircraft. The primary perspective view used in existing synthetic vision systems emulates a forward-looking cockpit viewpoint. Such a view is intuitive and provides helpful visual information to the pilot and crew.

A vehicle such as an aircraft may also utilize onboard sensors and systems (e.g., radar, light detection and ranging (lidar), laser detection and ranging (ladar) in military contexts, infrared (IR), ultraviolet (UV), and the like) to augment or enhance the forward-looking cockpit view and provide a visual representation of obstacles, objects, and other man-made and/or non-terrain features within the aircraft's current operating environment which may or may not be accounted for in the various databases (e.g., terrain databases, obstacle databases, airport databases, and the like) used for rendering the synthetic perspective view. These enhanced vision systems are particularly useful when operating a vehicle or aircraft in conditions of reduced visibility, such as, for example, whiteout, brownout, sea-spray, fog, smoke, low light or night-time conditions, inclement weather conditions, and the like. For example, an enhanced vision system may utilize real-time radar data in conjunction with one or more terrain databases to render a visualization of a landing zone for helicopter landing during brownout, such that the operator of the helicopter may ascertain the location of terrain features and various non-terrain features, such as other vehicles and buildings, that are proximate to the landing location and not represented by a priori databases.

However, conventional ranging systems produce visually-noisy or low resolution displays. For example, although a radar system can operate well in low visibility conditions, the graphical information obtained from a radar system may not accurately represent the size, shape, and/or visually distinguishable features of an object. In other words, a radar system usually represents objects in a graphically ambiguous manner. Thus, although a member of the flight crew can utilize a ranging system to recognize a likely location of an object, the person is unable to glean detailed information regarding the type and/or configuration of the object. In addition, if the ranging sensor sampling rate (i.e., the rate that the sensor updates) is too low relative to the speed of a moving object, the ranging system may be unable to accurately resolve the moving object. For example, a moving object may appear to jump across the display, appear as being blurred or smeared across the display, or the size of the moving object may be exaggerated. These visually noisy displays increase the perceptual processing and mental workload of the pilot and/or crew to adequately parse the displayed information, thus reducing the potential information superiority to be gained from the enhanced vision system.

BRIEF SUMMARY

A method of displaying information on a display element is provided. The method involves obtaining range data for objects located in a sensing region at a sampling time, obtaining image data corresponding to an image of the sensing region at the sampling time, deriving first graphics content from the range data, and deriving second graphics content from the image data. The method continues by correlating the first graphics content with the second graphics content such that they are spatially and temporally aligned with one another. Then, the correlated graphics content is rendered on the display element.

Another method of displaying information on a display element is also provided. This method involves obtaining first range data for an object located in a sensing region at a first sampling time, obtaining image data corresponding to an image of the object at the sampling time, and detecting low visibility conditions associated with the sensing region. The method continues by acquiring second range data for the object at a second sampling time that occurs after the first sampling time. The method processes the image data and the second range data to generate image graphics content for a predicted image that corresponds to a simulated view of the object at the second sampling time, and renders the image graphics content on the display element.

A display system for a vehicle is also provided. The display system includes: an onboard display element; an onboard ranging system configured to obtain, at a first sampling time, range data for an object located within a viewing region proximate the vehicle; an onboard imaging system configured to obtain, at the first sampling time, image data corresponding to an image of the object; at least one processor coupled to the onboard ranging system and the onboard imaging system; and a graphics system coupled to the processing architecture and to the display element. The graphics system and the at least one processor are cooperatively configured to: render a synthetic display of the viewing region on the display element, the synthetic display including a synthetic perspective view of terrain located in the viewing region; render, in the synthetic display, a graphical representation of the range data; and render, in the synthetic display, a graphical representation of the image data that is spatially and temporally correlated with the graphical representation of the range data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
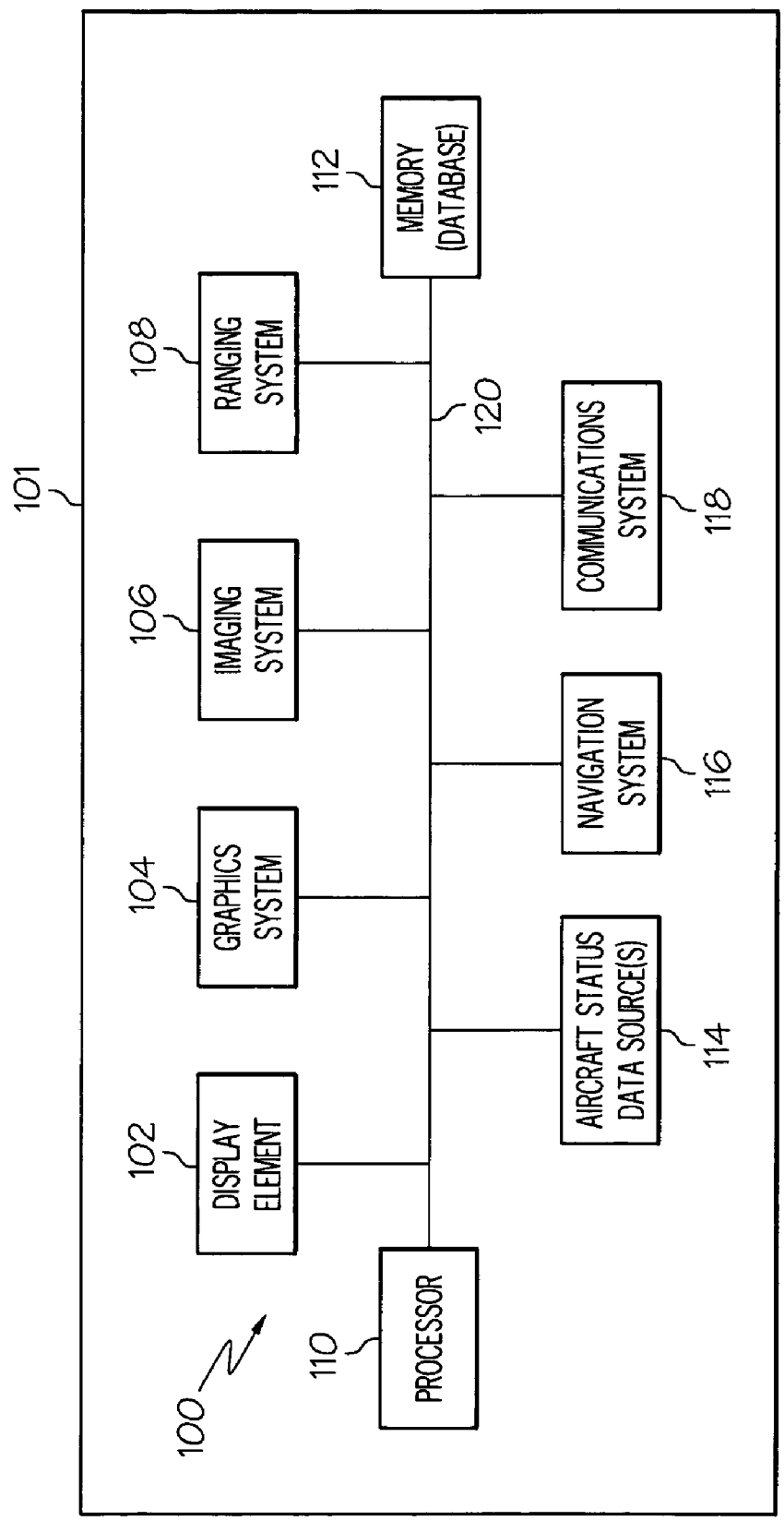
FIG. 1 is a schematic representation of a display system that is suitable for use with a vehicle such as an aircraft.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict certain exemplary arrangements of elements, additional intervening elements, devices, features, or components may be present in an embodiment of the depicted subject matter. Moreover, an embodiment may omit one or more of the illustrated elements or features as long as the described functionality remains intact.

For the sake of brevity, conventional techniques related to graphics and image processing, navigation, flight planning, aircraft controls, ranging systems, imaging systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to a display system adapted for displaying an image of an object overlying graphics content that is produced by a ranging system such as a radar system. Although the display system may be deployed in a variety of applications and contexts, the following description relates to a system that is onboard a vehicle such as an aircraft. In an exemplary embodiment, image data captured by a camera is correlated with real-time ranging system sensor data corresponding to the object. The image data is utilized to identify various physical characteristics or features of the object that may not be resolvable by the ranging system (e.g., due to the sensor resolution or speed of the object). By correlating the ranging system information and the image data, the display more accurately reflects the geometric and/or physical characteristics of the object along with the most recent position of the object. Thus, the pilot and/or crew can accurately identify the location of an object and glean information pertaining to the type and/or configuration of the object type in a quick and intuitive manner.

FIG. 1 is a schematic representation of a display system 100 that is suitable for use with a vehicle such as an aircraft 101. In exemplary embodiments, the display system 100 is located onboard the aircraft 101, i.e., the various components and elements of the display system 100 reside within the aircraft 101, are carried by the aircraft 101, or are attached to the aircraft 101. The illustrated embodiment of the display system 100 includes, without limitation: a display element 102; a graphics system 104; an imaging system 106; a ranging system 108; at least one processor 110; at least one memory element 112; at least one aircraft status data source 114; a navigation system 116; and a communications system 118. These elements of the display system 100 may be coupled together by a suitable interconnection architecture 120 that accommodates data communication, the transmission of control or command signals, and/or the delivery of operating power within the display system 100. It should be understood that FIG. 1 is a simplified representation of the display system 100 that will be used for purposes of explanation and ease of description, and that FIG. 1 is not intended to limit the application or scope of the subject matter in any way. In practice, the display system 100 and the aircraft 101 will include other devices and components for providing additional functions and features, as will be appreciated in the art. Furthermore, although the display system 100 is described herein in an aviation context, the display system 100 may be located onboard and/or associated with other vehicles, such as ground-based vehicles or maritime vessels.

The processor 110 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The memory 112 may be realized as RAM memory, flash memory, EPROM memory, EEPROM memory, registers, a hard disk, a removable disk, a CD-ROM, or any other form of storage medium known in the art. In this regard, the memory 112 can be coupled to the processor 110 such that the processor 110 can read information from, and write information to, the 112. In the alternative, the memory 112 may be integral to the processor 110. As an example, the processor 110 and the memory 112 may reside in an ASIC. In practice, a functional or logical module/component of the display system 100 might be realized using program code that is maintained in the memory 112. For example, the graphics system 104, the imaging system 106, the ranging system 108, the navigation system 116, or the communications system 118 may have associated software program components that are stored in the memory 112. Moreover, the memory 112 can be used to store data utilized to support the operation of the display system 100, as will become apparent from the following description. In this regard, the memory 112 may be considered to be a database or a server that supports the display system 100.

In an exemplary embodiment, the display element 102 is coupled to the graphics system 104. The graphics system 104 is coupled to the processor 110 such that the processor 110 and the graphics system 104 cooperate to display, render, or otherwise convey one or more graphical representations, synthetic displays, or images associated with operation of the aircraft 101 on the display element 102, as described in greater detail below. An embodiment of the display system 100 may utilize existing graphics processing techniques and technologies in conjunction with the graphics system 204. For example, the graphics system 104 may be suitably configured to support well known graphics technologies such as, without limitation, VGA, SVGA, UVGA, or the like.

In an exemplary embodiment, the display element 102 is realized as an electronic display configured to graphically display flight information or other data associated with operation of the aircraft 101 under control of the graphics system 104. The display element 102 is usually located within a cockpit of the aircraft 101. It will be appreciated that although FIG. 1 shows a single display element 102, in practice, additional display devices may be present onboard the aircraft 101. In addition, although FIG. 1 shows the display element 102 within the aircraft 101, in practice, the display element 102 may be located outside the aircraft 101 (e.g., on the ground as part of an air traffic control center or another command center) and communicatively coupled to the remaining elements of the display system 100 (e.g., via a data link).

The imaging system 106 is configured to capture and obtain image data, which can be processed, analyzed, stored, and/or rendered by the display system 100 as needed. For the embodiment described here (an aircraft deployment), the imaging system 106 includes an onboard camera that is oriented and focused in a manner that enables it to capture images corresponding to a forward-looking cockpit view. In other words, the imaging system 106 is intended to capture images from the perspective of the pilot or flight crew. Depending upon the particular implementation, the imaging system 106 may include a video camera, a still camera, an infrared camera or imaging device, a millimeter wave imager, a charge-coupled device (CCD), or the like. The display system 100 could also utilize images captured by other sources, such as a satellite-based imaging system or imaging systems that capture images from a perspective other than the cockpit. In certain embodiments, the image data could be derived or obtained using suitable data fusion techniques that process raw image data from any combination of such imaging devices. Notably, the image data captured by the imaging system 106 is akin to a photograph in that it conveys accurate and realistic detail and characteristics of the objects contained in the field of view. For example, the imaging system 106 can obtain an image of a scene at a given sampling time, and the image may contain relatively high-resolution depictions of buildings, landscaping, vehicles, people, signage, or other visually distinguishable features.

Alternatively (or additionally), the display system 100 could access and process image data that is stored in one or more onboard databases and/or one or more remotely located databases that are datalinked to the aircraft in some manner. The saved image data is associated with images that have been taken or generated from specified geographic positions and orientations. The saved images may be collected by a satellite system, during a previous flight, by an unmanned vehicle, or the like. Accordingly, real-time and live image data could be replaced or supplemented with stored image data corresponding to the given flight plan.

Figure 2:
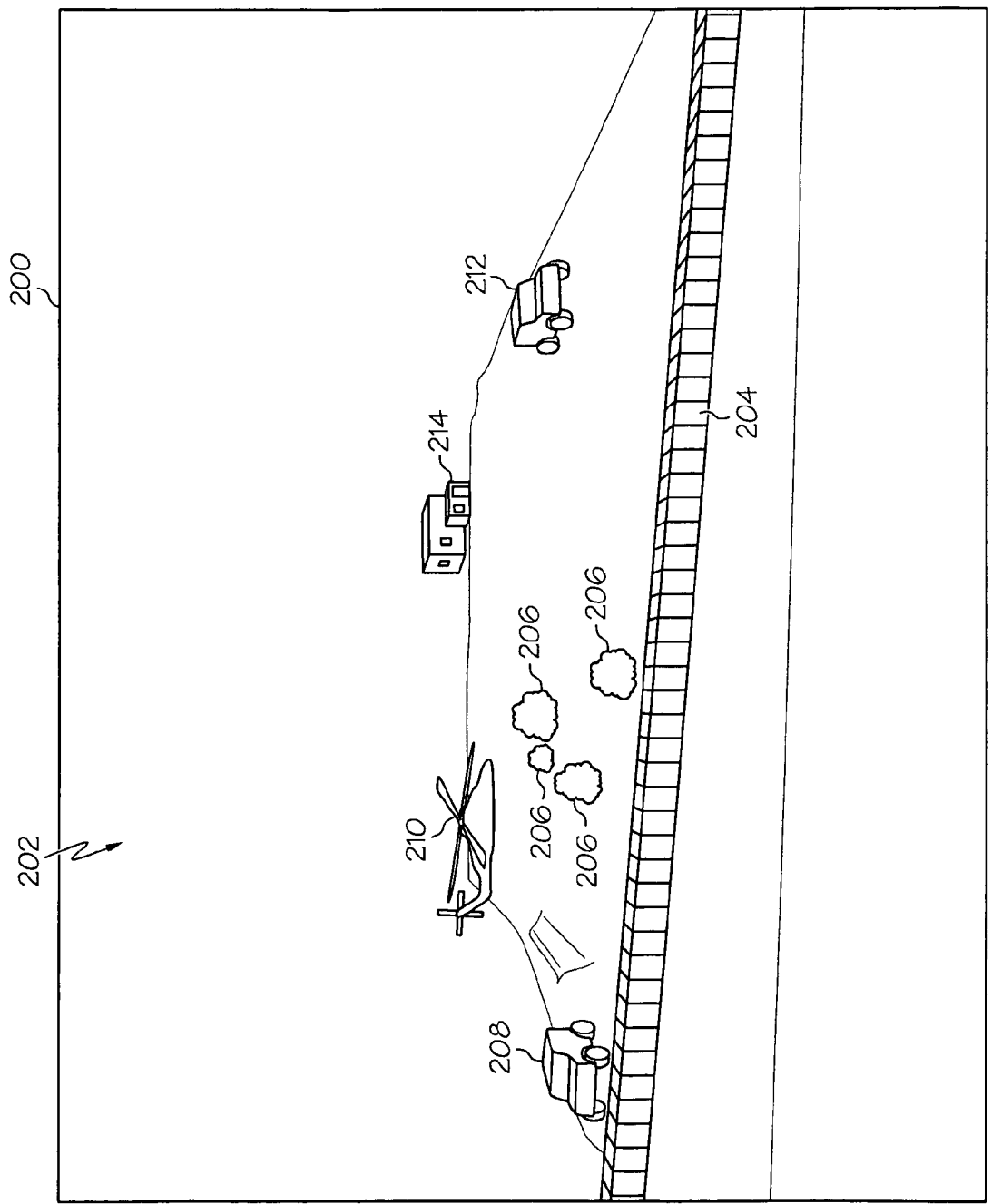
FIG. 2 is a schematic depiction of a display element with rendered graphics content generated by an onboard imaging system.

FIG. 2 is a schematic depiction of a display element 200 with rendered graphics content generated by an onboard imaging system. The display 202 rendered on the display element 200 roughly corresponds to a scene as captured by the imaging system at a time when visibility is good. Notably, the display 202 represents a captured image that includes visually distinguishable features and characteristics that can be easily interpreted by the user. For example, the display 202 includes image graphics content such as: a wall 204; plants or landscaping features 206; a vehicle 208; a helicopter 210; another vehicle 212; and a building 214. Thus, when visibility is good (e.g., little or no fog, rain, dust, etc.) the amount of visual detail provided by an imaging system exceeds that obtainable from a ranging system. Notably, even in low light conditions, an infrared imaging system could provide visual details as shown in FIG. 2.

The ranging system 108 is configured to obtain range data for an objected located within a sensing or viewing region that is proximate the aircraft 101. The collected range data can then be processed, analyzed, stored, and/or rendered by the display system 100 as needed. For the embodiment described here (an aircraft deployment), the ranging system 108 includes one or more emitters, sensors, antennas, transmitters, or the like that enables it to obtain information about objects that are in front of the aircraft 101. In other words, the sensing element of the ranging system 108 is oriented and positioned relative to the aircraft 101 such that the range data is indicative of objects that would be visible from the cockpit under clear conditions. Depending upon the particular implementation, the ranging system 108 may include a radar system (e.g., millimeter wave radar or x-band radar), a lidar system, an acoustic ranging system, an ultrasonic ranging system, or the like. In certain embodiments, the range data could be derived from image data (for example, changes in the perspective image size could be used for purposes of range estimation). Notably, the range data captured by the ranging system 108 typically indicates the presence of objects, and the distance to detected objects. The graphical representations of the detected objects tend to be generally depicted in a manner that is not very well defined. The ranging system 108, however, maintains its effectiveness in low visibility conditions, and range data for detected objects can be obtained even though it may be foggy, rainy, dusty, or snowy.

Thus, the ranging system 108 obtains the range to the detected objects using, for example, a three-dimensional mapping grid. In contrast, the imaging system 106 obtains real-world two-dimensional images of the objects under investigation. These two systems differ in the manner in which they present information to the user of the system. Moreover, these two systems differ in the type and amount of content and contextual meaning that is conveyed to the user of the system.

The processor 110 and/or the graphics system 104 are cooperatively configured to utilize range data to augment and/or enhance the display, thereby enhancing situational awareness. In an exemplary embodiment, the ranging system 108 comprises a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored and/or processed for display on the display element 102. In an exemplary embodiment, the ranging system 108 obtains and/or updates sensor data for the sensing region with a particular frequency, such that the sensor data is effectively represents the real-time status of the sensing region. For example, a typical radar sensor system generally operates with a frequency ranging from about tens of GHz to one hundred GHz or more. In this regard, the range data may be referred to as real-time sensor data, even though the range data may not be obtained in a perfectly continuous or real-time manner.

Figure 3:
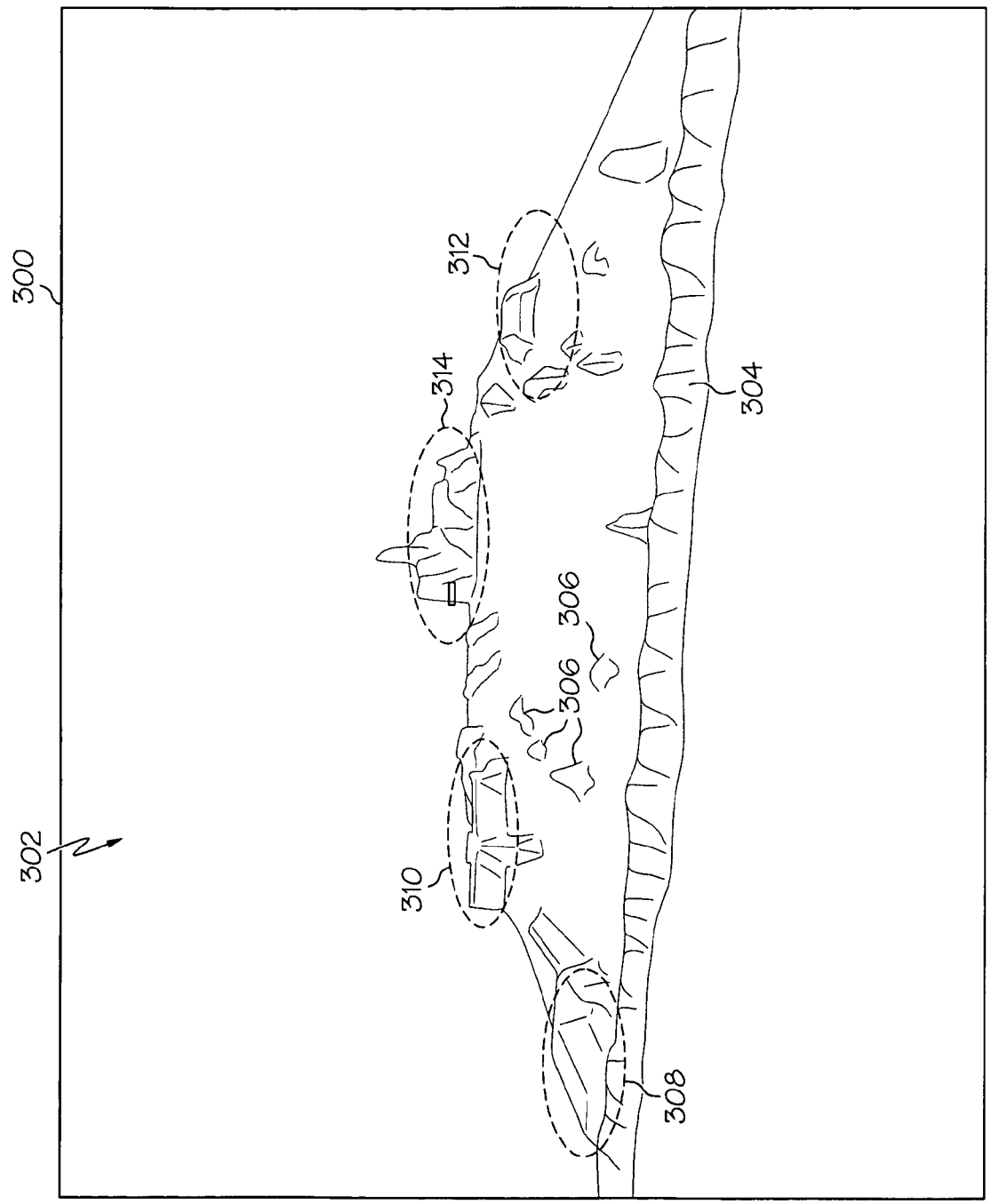
FIG. 3 is a schematic depiction of a display element with rendered graphics content generated by a ranging system.

FIG. 3 is a schematic depiction of a display element 300 with rendered graphics content generated by an onboard ranging system. The display 302 rendered on the display element 300 roughly corresponds to the scene depicted in FIG. 2, but as captured by the ranging system. In contrast to that shown in FIG. 2, however, the display 302 includes graphics content and features that may be described as "blobs" or "lumps" or "contours." In this regard, the display 302 includes range graphics content such as: a graphical feature 304 having the general shape and contour of the wall 204; graphical features 306 having the general shape and contour of the landscaping features 206; a graphical feature 308 that corresponds to the vehicle 208; a graphical feature 310 that represents the helicopter 210; a graphical feature that is associated with the vehicle 212; and a graphical feature that is indicative of the building 214. Although these features may accurately indicate the presence and proximity of objects within the field of view, they do not provide any realistic visual detail.

The aircraft status data source(s) 114 generate, measure, and/or provide different types of data related to the operational status of the aircraft 101, the environment in which the aircraft 101 is operating, flight parameters, and the like. In practice, the aircraft status data source(s) 114 may be realized using line replaceable units (LRUs), transducers, accelerometers, instruments, sensors, and other well known devices. The data provided by the aircraft status data source(s) 114 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 100 is suitably designed to process data obtained from the aircraft status data source(s) 114 in the manner described in more detail herein. In particular, the display system 100 can use the aircraft status data when processing stored image data under low visibility conditions.

The navigation system 116 is configured to obtain one or more navigational parameters associated with operation of the aircraft 101. The navigation system 116 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 116, as will be appreciated in the art. In an exemplary embodiment, the navigation system 116 and the processor 110 are cooperatively configured to obtain and/or determine the current geographic location of the aircraft 101 (e.g., the latitude and longitude), altitude or above ground level, and the heading of the aircraft 101 (i.e., the direction the aircraft is traveling in relative to some reference) during operation of the aircraft 101. The navigation system 116 may include or cooperate with a database of synthetic terrain images such that the display system 100 can render appropriate synthetic terrain content on the display element 102. The synthetic terrain displayed at any given time will be correlated with the particular geographic position, heading, attitude, and altitude of the aircraft 101, as determined by the navigation system 116.

In an exemplary embodiment, the onboard display system 100 generates a display pertaining to a sensing or viewing region proximate the aircraft 101. The display may include graphics content derived from terrain data, image data, and/or range data. In certain embodiments, graphics content derived from range data is superimposed with graphics content derived from image data, resulting in correlated graphics data that can be rendered on the display element 102. This allows the display system to take advantage of the benefits of the ranging system 108 and the benefits of the imaging system 106, regardless of visibility. Synthetic terrain data may also be rendered along with the correlated graphics data.

Figure 4:
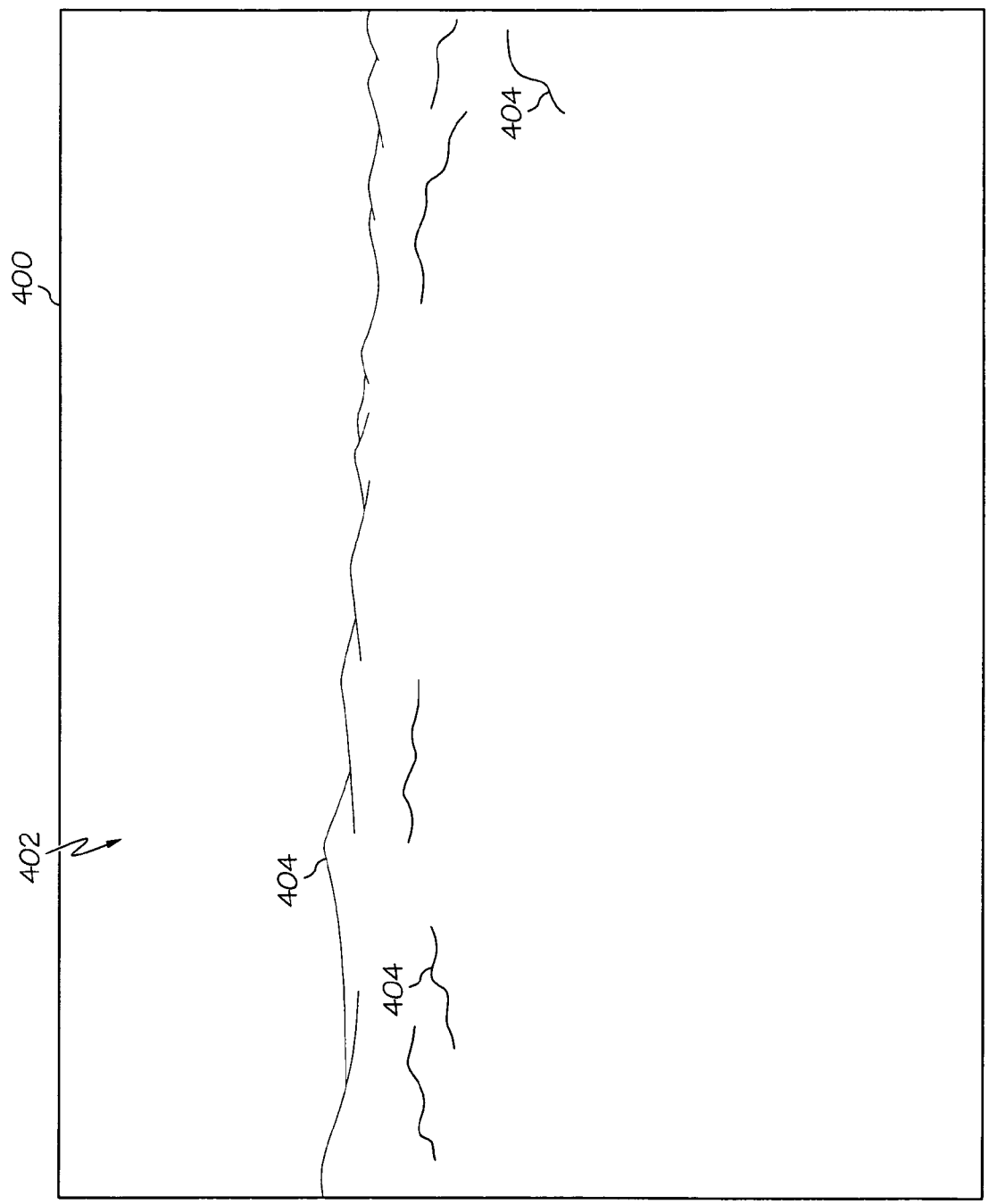
FIG. 4 is a schematic depiction of a display element with synthetic terrain rendered thereon.

FIG. 4 is a schematic depiction of a display element 400 with synthetic terrain rendered thereon. The display 402 rendered on the display element 400 roughly corresponds to the terrain within the viewing region of FIG. 2. The display 402 includes a graphical representation of terrain 404 that is rendered in a conformal manner. In this regard, the terrain 404 is rendered such that it accurately reflects and/or corresponds to the approximate real-world location of interest. The memory 112 or any suitable database may be utilized to store terrain data that can be accessed and processed as needed in real-time.

In an exemplary embodiment, the communications system 118 is suitably configured to support communications between the aircraft 101 and one or more remote systems. The communications system 118 may be utilized to obtain data (such as synthetic terrain data, image data associated with predefined flight plans, or the like) from a remote source. Such data received by the communications system 118 can be stored in the memory 112 for later use.

Figure 5:
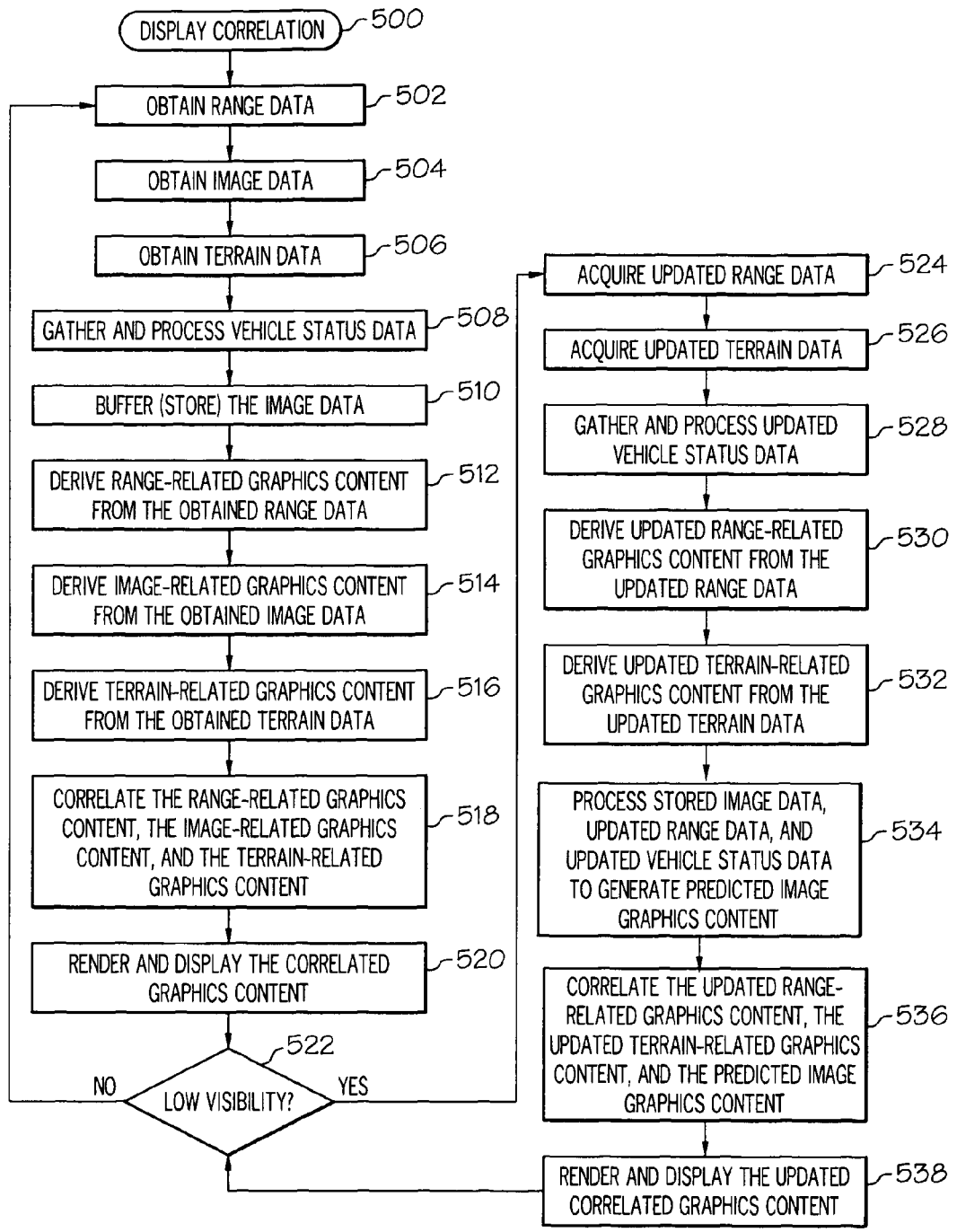
FIG. 5 is a flow chart that illustrates an exemplary embodiment of a display correlation process.

As explained above, the display system 100 can render a synthetic display of a viewing region on its display element 102, where the synthetic display includes a synthetic perspective view of terrain located in the viewing region. The synthetic display can also contain a graphical representation of range data associated with objects in the viewing region. Moreover, the synthetic display can also contain a graphical representation of image data associated with the objects. Notably, the rendered graphics content is derived by spatially and temporally correlating the image data with the range data. In this regard, FIG. 5 is a flow chart that illustrates an exemplary embodiment of a display correlation process 500. The various tasks performed in connection with the process 500 may be performed by software, hardware, firmware, or any combination thereof. For illustrative purposes, the following description of the process 500 may refer to elements mentioned above in connection with FIGS. 1-4. In practice, portions of the process 500 may be performed by different elements of the described system, e.g., the graphics system, the imaging system, the ranging system, or the processor. It should be appreciated that the process 500 may include any number of additional or alternative tasks, the tasks shown in FIG. 5 need not be performed in the illustrated order, and the process 500 may be incorporated into a more comprehensive procedure or process having additional functionality not described in detail herein. Moreover, one or more of the tasks shown in the process 500 may be optional, and such tasks could be omitted from a system that implements the process 500.

In an exemplary embodiment, the process 500 obtains range data for one or more objects located in a sensing region (task 502). The range data is obtained at a particular sampling time, e.g., the current real time. The sensing region preferably overlaps at least a portion of the forward-looking viewing region defined by the flight deck viewpoint, for example, as shown in FIG. 3. It should be appreciated that the size and/or orientation of the sensing region relative to the aircraft will depend on the particular type and configuration of the ranging system onboard the aircraft. The process 500 also obtains image data corresponding to an image of the sensing region (task 504). The image data is obtained at or near the same time as the range data. The image data may be obtained from an onboard camera in real-time, or it may be obtained from an a priori database of stored images that correspond to the current geographic position, flight plan, attitude, and orientation of the aircraft. The process 500 may also obtain terrain data that corresponds to terrain located in the sensing region (task 506). The terrain data is obtained at or near the same time as the range data. The terrain data is preferably obtained from an onboard a priori database of synthetic terrain images. This embodiment of the process 500 also gathers, collects, and processes status data for the vehicle or aircraft (task 508). In certain circumstances, this status data can be used to update the display in the manner described in more detail below.

If the image data obtained during task 504 is real-time image data, then the process 500 buffers or stores the image data (task 510) for subsequent processing, if necessary. If the image data obtained during task 504 represents previously-stored data from an a priori database, then task 510 is omitted.

Next, the onboard graphics system can process the graphics-related data in an appropriate manner for rendering on the display element. For example, the process 500 may derive range-related graphics content from the obtained range data (task 512). In practice, task 512 may be associated with the processing of the raw sensor data that is obtained by the ranging system, where such processing results in data that is formatted for display on the display element. Thus, the range-related graphics content conveys a visual representation of the objects located in the sensing region.

The process 500 may also derive image-related graphics content from the obtained image data (task 514). In practice, task 514 may be associated with the processing of the raw image data that is obtained by the imaging system, where such processing results in data that is formatted for display on the display element. Thus, the image-related graphics content conveys a visual representation of the objects located in the sensing region.

The process 500 may also derive terrain-related graphics content from the obtained terrain data (task 516). In practice, task 516 may be associated with the processing of the synthetic terrain data, where such processing results in data that is formatted for display on the display element. Thus, the terrain-related graphics content conveys a visual representation of the terrain located in the sensing region.

Next, the process 500 may continue by correlating the different types of graphics content such that they are spatially and temporally aligned with one another, resulting in correlated graphics content (task 518). In preferred embodiments, task 518 represents the correlation of the range-related graphics content, the image-related graphics content, and the terrain-related graphics content. In practice, task 518 could overlay or superimpose the various graphics content, blend the graphics content together, or otherwise create the correlated graphics content such that it simultaneously conveys at least a portion of the range-related graphics content, the image-related graphics content, and the terrain-related graphics content.

In an exemplary embodiment, graphics data correlation can be performed in various ways. For example, the process 500 may match objects that are conveyed in the range data with corresponding objects that are conveyed in the image data. In this manner, certain features and characteristics of the range data can be associated with their counterpart items in the image data. As another example, the process 500 could employ graphics analysis techniques such as edge analysis to track movement of objects within the sensing region.

Figure 6:
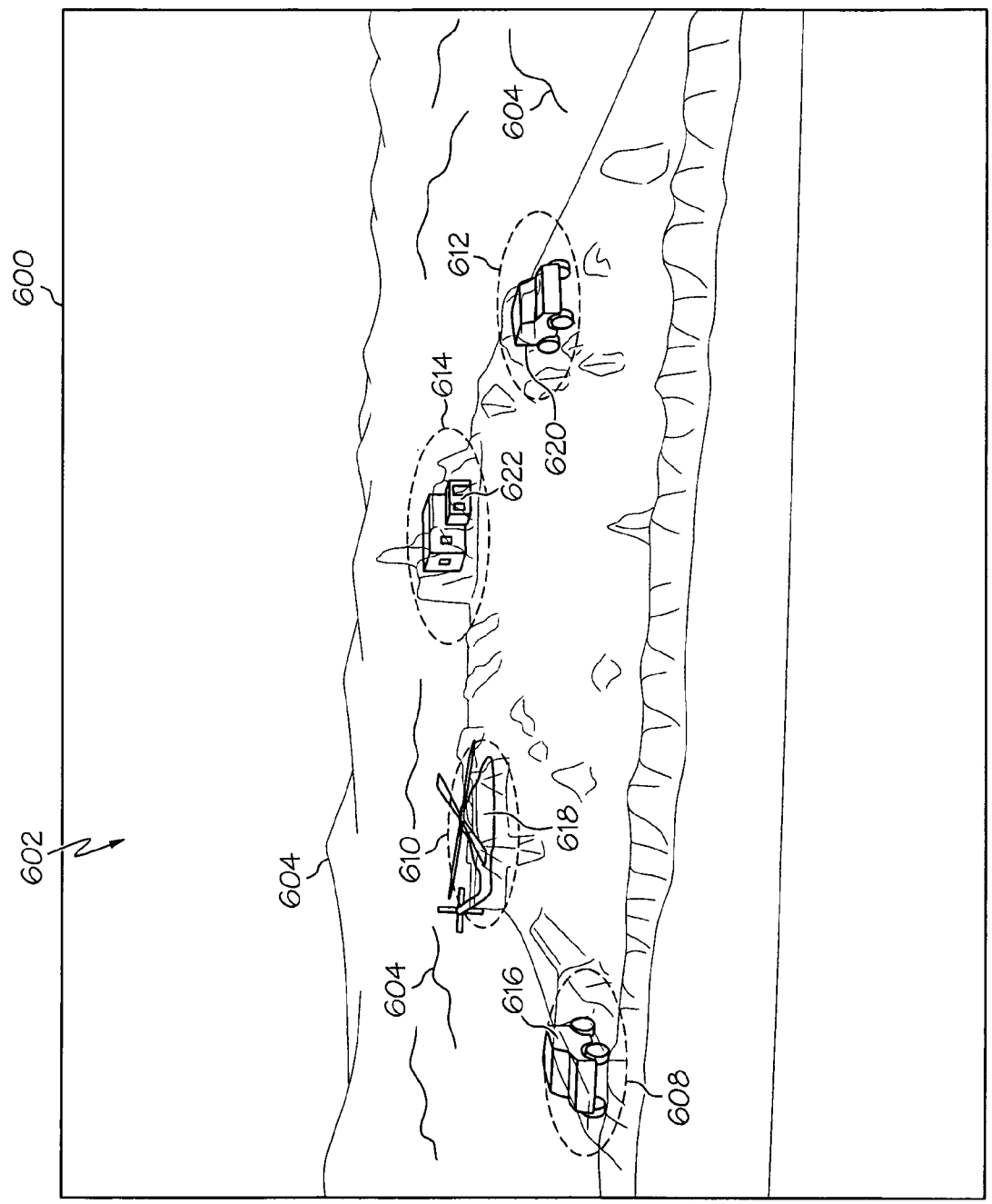
FIG. 6 is a schematic depiction of a display element having rendered thereon correlated graphics content.

After the graphics content has been correlated, the process 500 can render and display the correlated graphics content (task 520) on the display element. In this regard, FIG. 6 is a schematic depiction of a display element 600 having rendered thereon a display 602 of correlated graphics content. FIG. 6 shows how the output of the ranging system, the imaging system, and the synthetic terrain system can be blended and correlated to generate the enhanced display 602. This particular example includes a synthetic perspective view of terrain 604, with range-related graphics content and image-related graphics content superimposed thereon. In this regard, the range-related graphics content includes, without limitation: a graphical feature 608 associated with a vehicle; a graphical feature 610 associated with a helicopter, a graphical feature 612 associated with another vehicle, and a graphical feature 414 associated with a building. Moreover, the image-related graphics content includes, without limitation: an image of the vehicle 616; an image of the helicopter 618; an image of the other vehicle 620; and an image of the building 622. The display 602 contains other range-related graphics content and correlated image-related graphics content that is neither labeled nor described herein. Notably, the display system may correlate the range data with the image data by making an appropriate association between graphical features, objects, or characteristics.

FIG. 6 illustrates how the image data enhances the range data by providing visually distinguishable content at or near the "blobs" associated with objects detected by the ranging system. In practice, visual characteristics of the range-related graphics content and/or the image-related graphics content can be modulated or adjusted as needed, and depending upon the particular operating conditions, aircraft status, user preferences, etc. For example, it may be desirable to display the image-related content more prominently than the range-related content, so that the display 602 is easy to read and interpret. As another example, it may be desirable to completely eliminate the range-related graphics content when visibility is good and, therefore, the image-related graphics content can be obtained accurately in real-time. Conversely, it may be desirable to render the range-related graphics content more prominently during times of low visibility.

In certain embodiments, the process 500 accommodates low visibility conditions by processing stored image data. In this regard, the process 500 may monitor for the occurrence of low visibility conditions associated with the sensing region (query task 522). The display system could implement query task 522 by analyzing the image data itself (e.g., checking whether objects have become obscured or difficult to ascertain), by checking environmental sensors (e.g., to determine whether inclement weather has restricted visibility), or the like. If visibility remains high, then the process 500 may return to task 502 to update the range data, the image data, and the terrain data for a subsequent sampling time. In this manner, the process 500 can be iteratively performed to continuously update the display with current graphical content. If query task 522 detects low visibility conditions, then process 500 continues by acquiring updated range data (task 524) using the ranging system. The updated range data is obtained at a sampling time that occurs after the sampling time of the initial range data. Thus, the updated range data will reflect any movement of the host vehicle and/or any movement of objects within the sensing region, where such movement occurs between the initial sampling time and the subsequent sampling time.

The process 500 may also acquire updated synthetic terrain data (task 526). The updated synthetic terrain data is obtained at the new sampling time such that it is temporally aligned with the updated range data. Thus, the updated terrain data will reflect any movement of the host vehicle during the time between the initial sampling time and the new sampling time.

In addition, the process 500 can gather and process any updated vehicle status data (task 528). The updated vehicle status data is also obtained at the new sampling time. This enables the display system and the process 500 to determine any changes in cockpit perspective that may result from movement of the host vehicle. For example, if the vehicle has remained stationary between the initial sampling time and the new sampling time, then vehicle status data associated with movement or positioning of the vehicle need not be processed. On the other hand, if the vehicle has pitched, rolled, turned, or otherwise moved, then the synthetic view from the cockpit will be altered. A changed viewpoint orientation and perspective will be important to consider for reasons described below.

The process 500 may then proceed by deriving updated range-related graphics content from the updated range data (task 530) and by deriving updated terrain-related graphics content from the updated terrain data (task 532). Tasks 530 and 532 are similar to the respective tasks 512 and 516 (described above), however, the graphics content will instead reflect the current state of the vehicle and the observed sensing region. Notably, since this portion of the process 500 assumes that visibility is low, real-time image data need not be collected or processed at this time. Rather, the display system can process buffered image data (stored during task 510), the updated range data, and the updated vehicle status data to generate predicted image graphics content (task 534). The predicted image graphics content is associated with a predicted image that corresponds to a simulated or anticipated view of the objects in the sensing region. Such predictive processing is desirable in low visibility conditions where the imaging system may have difficulty capturing accurate, detailed, and meaningful images. In practice, task 534 can analyze and process various parameters, sensor-based information, and vehicle status data to determine how best to manipulate, scale, alter, or otherwise modify the stored image data. For example, task 534 can compensate for movement of detected objects, where such movement occurs between the first sampling time (when the stored image data was captured) and the second sampling time (which occurs after the display system detects the low visibility conditions). Task 534 may also compensate for movement of the vehicle itself, where such movement occurs between the first and second sampling times.

The updated range data is utilized to monitor movement of an object located in the field of view. Thus, even though visibility might be low, the ranging system will still accurately track the current position of the object. The display system can leverage this tracking capability to reposition the stored image of the object and to superimpose or overlay the manipulated image in an accurate position on the display element. Vehicle status and geographic position data may also be processed to determine whether the size of the object as rendered on the display element should be increased or decreased. For example, if the vehicle has moved closer to the object, then the display system will expand the scale of the rendered object by an appropriate amount. Conversely, if the vehicle has moved away from the object, then the display system will reduce the scale of the rendered object. Similarly, the rendered object might be rotated, or the viewing angle might be altered to accommodate maneuvering of the vehicle (e.g., pitch, roll, yaw, turning, climb, decent, etc.).

Next, the process 500 correlates updated range-related graphics content, the updated terrain-related graphics content, and the predicted image graphics content (task 536). This correlation step is similar to that described above for task 518. Here, the graphics content is correlated such that it is spatially and temporally aligned. Notably, the correlated graphics content that results from task 536 may contain some content associated with stored image data, namely, a manipulated or image-processed version of the stored image data.

Thereafter, the correlated graphics content is rendered and displayed on the display element (task 538) for presentation to the user. The rendered display will appear similar to that shown in FIG. 6, however, the graphical content associated with the displayed objects may be derived from stored image data rather than real-time image data.

FIG. 5 depicts task 538 leading back to query task 522. An embodiment of the process 500 may again check a visibility metric at this time to determine whether to continue using stored image data or to revert back to real-time image data, as described previously.

To briefly summarize, the methods and systems described above allow relatively noisy or imprecise ranging data to be resolved using image data that accurately reflects the real-world objects detected by the ranging sensors. By correlating the ranging data with the image data, otherwise ambiguous features of the display may be augmented to provide a more accurate visual representation of the various objects in the field of view, thereby reducing the perceptual processing and mental workload on behalf of the pilot and/or crew. This is particularly useful in situations where the position of other objects and/or vehicles is critical, for example, helicopter landings in reduced visibility or otherwise degraded operating environments, or in situations where the sensor data would otherwise be of limited utility, for example, when objects and/or vehicles are moving such that the sensor data for the objects is blurred or when the sensors have low resolution. The range-related graphics content and the image-related graphics content may be rendered using various techniques such as overlapping, superimposing, blending, image processing, or the modulation of visually distinguishable characteristics. Moreover, the display may be updated dynamically with real-time image data or with stored image data that is image-processed in an intelligent and predictive manner. As a result, the display more accurately emulates the real-time real-world operating environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of displaying information on a display element, the method comprising:
    obtaining first range data for an object located in a sensing region at a first sampling time;
    obtaining image data corresponding to an image of the object at the sampling time;
    detecting low visibility conditions associated with the sensing region;
    acquiring second range data for the object at a second sampling time that occurs after the first sampling time;
    processing the image data and the second range data to generate image graphics content for a predicted image that corresponds to a simulated view of the object at the second sampling time; and
    rendering the image graphics content on the display element.

2. The method of claim 1, wherein obtaining first range data comprises receiving sensor data from a radar system.

3. The method of claim 1, wherein obtaining first range data comprises receiving sensor data from a system selected from the group consisting of: a lidar system; an acoustic ranging system; and an ultrasonic ranging system.

4. The method of claim 1, wherein obtaining image data comprises receiving sensor data from a camera.

5. The method of claim 1, wherein obtaining image data comprises receiving sensor data from a millimeter wave imager.

6. The method of claim 1, wherein obtaining image data comprises receiving sensor data from a charge-coupled device.

7. The method of claim 1, further comprising buffering the image data prior to detecting the low visibility conditions.

8. The method of claim 1, wherein processing the image data compensates for movement of the object that occurs between the first sampling time and the second sampling time.

9. The method of claim 1, wherein:
the display element is onboard a vehicle; and
processing the image data compensates for movement of the vehicle that occurs between the first sampling time and the second sampling time.

10. The method of claim 9, wherein processing the image data further compensates for movement of the object that occurs between the first sampling time and the second sampling time.

11. The method of claim 1, further comprising:
deriving range graphics content from the second range data; and
correlating the image graphics content with the range graphics content such that they are spatially and temporally aligned with one another, resulting in correlated graphics content; wherein
the rendering step renders the correlated graphics content on the display element.

12. The method of claim 11, wherein the correlated graphics content represents the image graphics content superimposed with the range graphics content.

13. The method of claim 11, further comprising:
obtaining terrain data corresponding to terrain located in the sensing region at the second sampling time; and
deriving terrain graphics content from the terrain data; wherein
the correlating step correlates the image graphics content with the range graphics content and with the terrain graphics content such that the image graphics content, the range graphics content, and the terrain graphics content are spatially and temporally aligned with one another, resulting in the correlated graphics content.

14. A display system for a vehicle, the display system comprising:
an onboard display element;
an onboard ranging system configured to obtain, at a first sampling time, range data for an object located within a viewing region proximate the vehicle;
an onboard imaging system configured to obtain, at the first sampling time, image data corresponding to an image of the object;
at least one processor coupled to the onboard ranging system and the onboard imaging system; and
a graphics system coupled to the processing architecture and to the display element, wherein the graphics system and the at least one processor are cooperatively configured to:
render a synthetic display of the viewing region on the display element, the synthetic display including a synthetic perspective view of terrain located in the viewing region;
render, in the synthetic display, a graphical representation of the range data; and
render, in the synthetic display, a graphical representation of the image data that is spatially and temporally correlated with the graphical representation of the range data;
wherein the graphics system and the at least one processor are cooperatively configured to:
process the image data and updated range data obtained from the ranging system at a second sampling time that occurs after the first sampling time;
generate an updated graphical representation of the image data that represents a predicted image of the object as perceived at the second sampling time; and
render, in the synthetic display, the updated graphical representation of the image data such that it is spatially and temporally correlated with the updated range data.

15. The display system of claim 14, wherein:
the onboard ranging system comprises a system selected from the group consisting of a radar system, a lidar system, an acoustic ranging system, and an ultrasonic ranging system; and
the onboard imaging system comprises a system selected from the group consisting of a camera, an infrared camera, a millimeter wave imager, and a charge-coupled device.

16. The display system of claim 15, wherein the updated graphical representation of the image data compensates for movement of the vehicle that occurs between the first sampling time and the second sampling time.

* * * * *